May 10, 1927.

F. X. KUHN 1,627,854

ICE CREAM PACKAGE AND METHOD OF AND APPARATUS FOR MAKING THE SAME

Filed Jan. 25, 1927        3 Sheets-Sheet 1

Inventor:
Frederick X. Kuhn,
by Emery Booth Janney Varney
Attys.

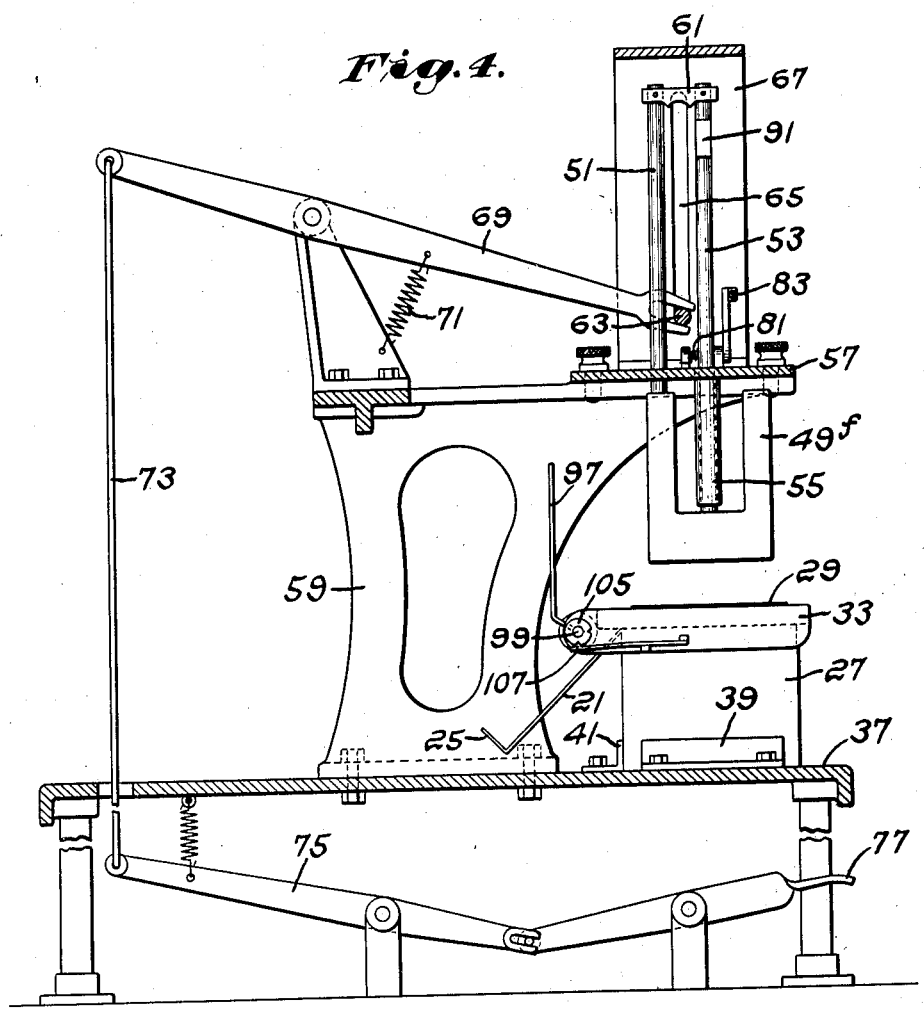

May 10, 1927. 1,627,854
F. X. KUHN
ICE CREAM PACKAGE AND METHOD OF AND APPARATUS FOR MAKING THE SAME
Filed Jan. 25, 1927 3 Sheets-Sheet 3
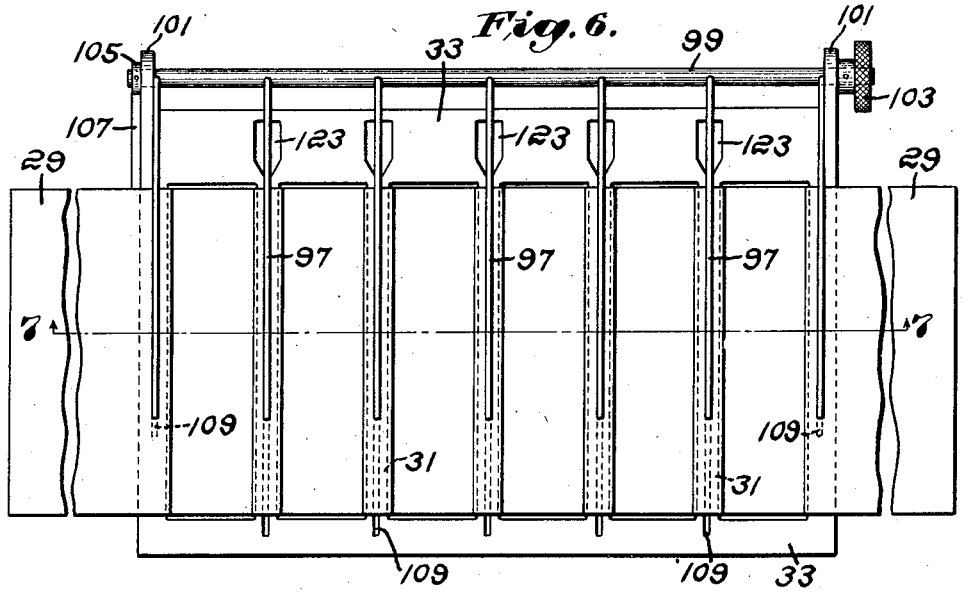
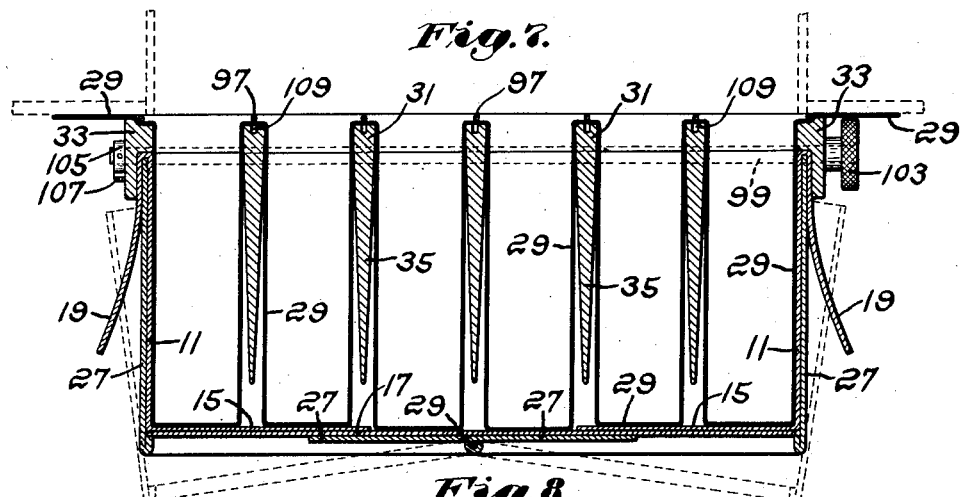
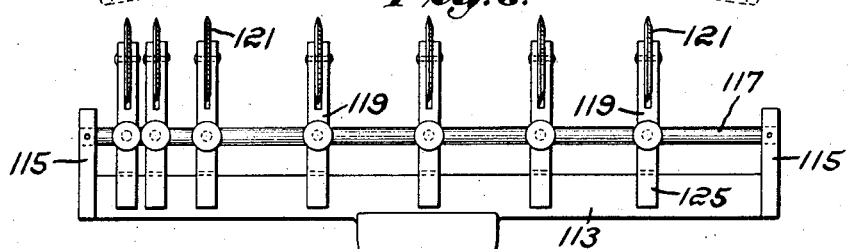
Inventor:
Frederick X. Kuhn, Patented May 10, 1927.

1,627,854

UNITED STATES PATENT OFFICE.

FREDERICK X. KUHN, OF WALTHAM, MASSACHUSETTS.

ICE-CREAM PACKAGE AND METHOD OF AND APPARATUS FOR MAKING THE SAME.

Application filed January 25, 1927. Serial No. 163,382.

This invention relates to containers for separated portions of ice cream or similar material and method of and apparatus for preparing the same, being more particularly intended to facilitate the charging of a carton or other container with ice cream or the like in the form of individual separated portions.

The invention will be best understood by reference to the following description when taken in connection with the accompanying illustration of one specific embodiment thereof, while its scope will be more particularly pointed out in the appended claims.

In the drawings:

Fig. 4 is a side elevation in partial section of the apparatus shown in Fig. 1;

Fig. 5 is a transverse sectional elevation on an enlarged scale showing the dividing rack applied to the mouth of the container prior to installing the paper or other separating material therein;

Fig. 6 is a plan view of the container with the rack applied thereto and the separating material inserted therein;

Fig. 7 is a longitudinal sectional elevation on the line 7—7 in Fig. 6; and

Fig. 8 is a plan view of the severing device used for severing the separating material between the individual compartments thereof after the container has been filled.

In filling a carton or other container with bricks or masses of ice cream or similar material where individual units or portions are provided, it is usual to furnish each portion with a wrapping, covering or separator of thin, membraneous material, such, for example, as waxed paper. In preparing such bricks for distribution it has been customary heretofore to first prepare the cream in brick or block form and in a hard, frozen condition and then to cut or sub-divide it into a number of individual portions of the desired size, the latter being then separately and manually wrapped or covered by the paper covering and then inserted and packed by hand in the carton. The carton is then placed in a freezing chamber and its contents again brought to a hard, frozen condition, after which it is ready for distribution. The several steps required in this process add to the labor, time and expense of preparing and packing the ice cream, and the process of manually wrapping and handling the individual portions is objectionable from a sanitary standpoint.

Through the present invention a carton may be filled directly with semifrozen ice cream or other material, such as sherbet or the like, taken from bulk and introduced into the carton in such manner that the contents thereof are separated into individual portions, each with its individual wrapper which may be subsequently withdrawn from the carton with the ice cream portion after the latter has been hard frozen, and this charging of the carton may be accomplished by a single operation and without necessary manual handling of the ice cream or wrapper.

In the illustrative form of the invention, this object is carried out by preparing an unpartitioned carton with separating material so installed as to form individual compartments, the carton in this condition being then filled with the ice cream, either manually or by a charging machine, so that the membraneous separating walls installed within the carton sub-divide the bulk contents thereof into the necessary individual portions.

Figure 2:
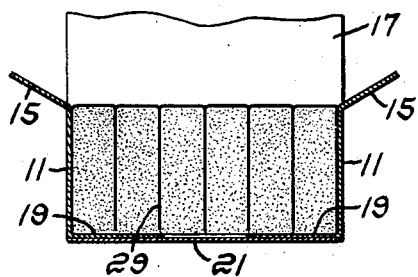
Fig. 2 is a sectional view of the container with its separated individual portions of ice cream after the same has been filled and in condition for distribution to the consumer.

Referring to the drawings and more particularly to Figs. 5, 7 and 2, the container, which is herein shown as a cardboard carton of a form commonly used for this purpose and in which the ice cream is delivered to the ultimate consumer, consists of a rectangular box having the ends 11 and the sides 13. The box is reversible as to its top and bottom, both top and bottom being provided with end flaps and a side flap. The end flaps for what is represented in the drawings as the bottom are shown at 15 and the side flap at 17. The end flaps for what is there represented as the top are shown at 19 and the side flap at 21. The bottom side flap has the infold 23 (Fig. 5) and the end flap for the top has the infold 25 (see Fig. 4), by means of which infolds the side flaps are tucked into place when the box is closed.

To afford a rigid support to the pasteboard carton while there is being installed therein the separating material and while the carton is being charged with the ice cream, there is preferably provided a rigid form or cage in which the carton is adapted to fit, such cage comprising a skeleton sheet-metal box 27 (Figs. 1, 4, 5 and 7), the bottom of which is hinged at 29 so that it may be opened more or less, as represented in part by dotted lines in Fig. 7, to facilitate the insertion of the empty carton and the withdrawal of the filled carton. The sheet-metal cage 27 is of substantially the same dimensions as the carton so that the top of the latter comes substantially flush with the upper rim of the cage.

In order to charge the container with the individual separated and covered portions of ice cream, the container is prepared for the charging operation by the installation of separating membraneous material which, during the charging operation, is held in the form of pockets or compartments such that they separate the charge transversely into a number of equal individual portions.

Any suitable material and prepared in any suitable form may be employed for this purpose, but in the illustrative embodiment of the invention the separating material consists of a continuous sheet or strip 29 of waxed or paraffin paper of somewhat less than the width of the container and running lengthwise the long dimension of the carton, arranged in folded or draped relation over a series of transverse dividing members 31. The latter form part of a temporary support in the form of a removable dividing rack or grid 33, so that a series of equi-dimensioned pockets or compartments are formed by the separating strip (see Fig. 7) into which the ice cream is entered, the rack with its dividing members being subsequently withdrawn after the charging operation and before the container is closed.

The dividing rack 33 is rectangular in form, adapted to rest on flush on the side edges of the carton (Fig. 5) and down over the end edges and the back folded end flaps (Fig. 7) and over the open mouth. When fitted over the open mouth of the carton, as represented in the drawings, the dividing members 31 extend transversely across the open mouth in equally spaced relation. Each dividing member 31 projects below the sides of the frame to fit (see Fig. 5) snugly within the walls of the carton and is prolonged downwardly to provide the rigid separating and dividing plate 35 (see Fig. 5) adapted to project down into the carton. The plate 35 is tapered, as viewed in cross section in Fig. 7, to facilitate its withdrawal with the frame when the carton is filled with ice cream.

In preparing the container, the carton is first inserted within the form or cage 27, the end flaps 19 and side flap 21 folded back and the dividing rack placed in position, as indicated in Fig. 5, and fitted over the mouth of the carton. It is then ready to have installed the separating strip 29.

Figure 1:
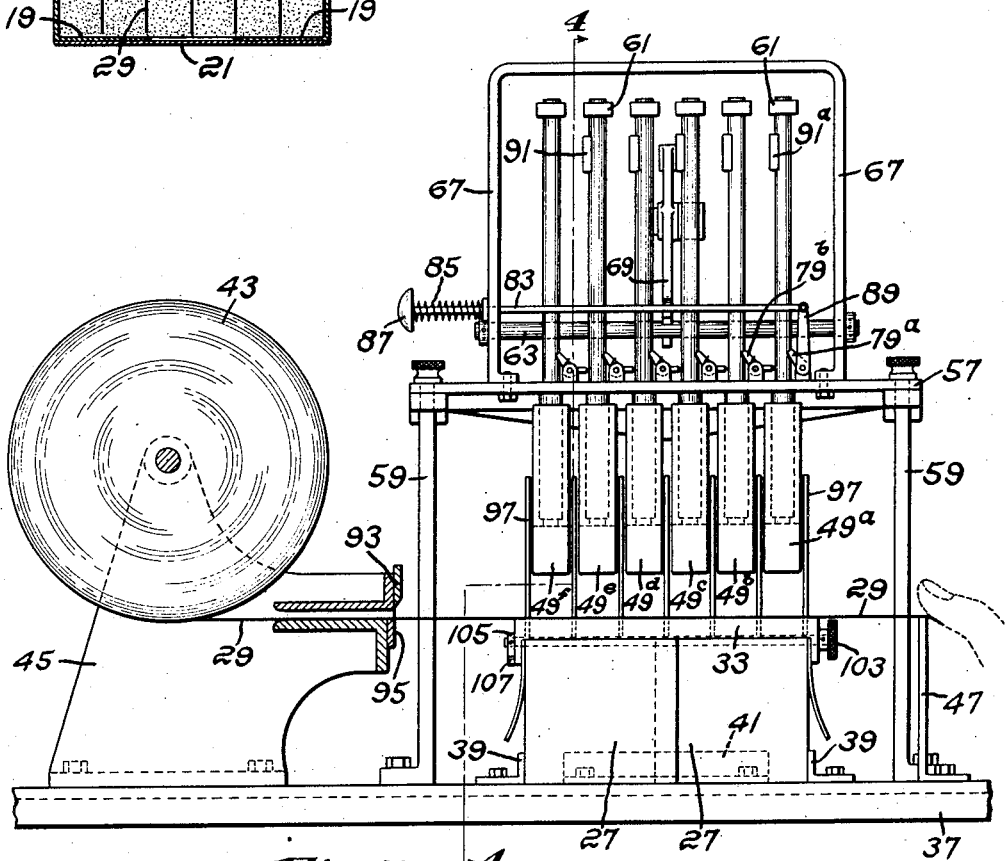
Fig. 1 is a front elevation of an apparatus for preparing a container embodying one form of the invention.
Figure 3:
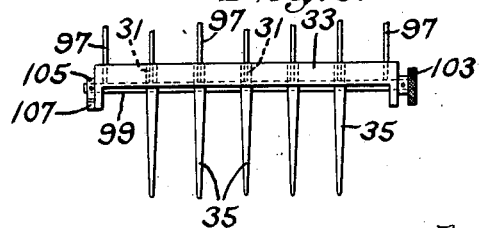
Fig. 3 is a side elevation of one form of dividing rack utilized in connection with this invention.

As a simple and convenient means of installing the separating material in the carton, I have shown the apparatus illustrated in Figs. 1 and 4. The cage 27 with the contained carton and the temporary supporting and dividing frame, all assembled just as described, are placed upon a supporting table 37 between three locating pieces 39, 39 and 41. The end of the waxed paper strip 29 is then drawn from the supply reel 43 which is journaled on the bracket 45 carried by the table 37, the paper being drawn over and in contact with the top of the dividing frame 33 and its free end held either manually or otherwise against the rest 47.

The strip of material thus held over the dividing frame is then ready to be forced down between the dividing members to form the pockets, this being performed in the illustrative form of the apparatus by the following devices:

Mounted above the table 37 and over the positioned carton, so as to align and register with the compartments defined by the dividing members 31 of the removable frame 33, are a plurality of vertically movable plungers $49^a$, $49^b$ ... $49^f$, which, when depressed, are adapted to enter and substantially fill the spaces within the carton between the dividing members and to carry the paper strip with them into the carton, so as to fold and tuck the same therein and form the separate compartments or pockets, as indicated in Fig. 7.

Each plunger 49 is U-shaped (Fig. 4), one leg being connected to the vertical rod 51 and the mid portion of the plunger being connected to the parallel vertical guide rod 53. The latter passes through the guiding sleeve 55 secured to the plate 57 supported by the uprights 59 on the table 37. The upper ends of the rods 51 and 53 for each plunger are connected together by the cross head 61 and there is provided in operative relation to the series of cross heads the single transversely arranged rod 63 guided in the vertical slots 65 formed in the upright frame pieces 67. Accordingly when the rod is raised to contact with the several cross heads 61, all the cross heads and plungers are simultaneously lifted to a position, such as is shown in Figs. 1 and 4. To raise the plungers, the rod 63 is engaged by the forked end of the lever 69, the latter being normally depressed by the spring 71 adapted to be lifted by the link 73 connected to the lever 75 beneath the support 37, which lever in turn may be actuated by the foot treadle 77.

Prior to placing the prepared carton on the support 37, the foot treadle 77 has been depressed thereby lifting all the plungers to the position shown in Figs. 1 and 4. In that position the plungers are held by a series of spring-pressed pawls or detents, 79ª, 79ᵇ, etc., which are pivotally mounted on the plate 57 and are each normally forced by its spring 81 (Fig. 4) into engagement with a notch on the side of the corresponding guide rod 53.

When the plungers have been raised as described, the carton placed in the machine and the paper strip drawn into the position indicated in Fig. 1, the plungers are then released and caused to descend, forcing the paper into the carton in the folded relationship indicated in Fig. 7.

In order best to perform this operation smoothly and without tearing the paper, the plungers are caused to act in succession, the one furthest from the supply roll being caused first to descend, and its movement being followed by the next adjacent plunger and so on. The free end of the paper being held at the rest 47, the draft or feed of the paper required for filling the compartment is had, easily and without friction, from the supply roll which turns to feed out the needed supply.

In the illustrated embodiment of the invention the plungers are allowed to descend under their own weight, but, if desired, springs or other positive actuating devices may be employed for that purpose. In order to provide the sequence of operation of the plungers, there is provided a horizontal releasing rod 83 (Figs. 1 and 4) which is normally thrown to an inactive position by the spring 85 (Fig. 1). The releasing rod has a thumb piece 87 and at its opposite end is pivoted to the lever 89 connected to the releasing pawl 79ª. When the thumb piece is pressed the rod moves laterally, the detent or dog 79ª is moved to release its rod and the plunger 49ª descends. In its descent it carries with it the paper strip and folds it or tucks it into the compartment which is defined by the end of the frame 33 and the next adjoining partition member 31.

When the plunger approaches the end of its descent and has drawn off from the supply roll 43 what paper is required to fill that compartment, the trip or detent 79ᵇ for the next adjoining guide rod is released by engagement between a projection on the detent and a cooperating projection 91ª carried by the upper end of the first guide rod which is completing its descent. The second plunger 49ᵇ being released, likewise descends, duplicating the action of the preceding plunger 49ª. Through the action of similar mechanism, the second plunger, near the completion of its movement, serves to release the next succeeding plunger, and this action is repeated in rapid succession until the last plunger of the series has descended, entered the carton and formed the last paper lined pocket of the series. In actual operation the movements of the plungers take place in rapid succession and the paper is installed in the desired relationship to the carton and the dividing frame in a few seconds' time.

When the last plunger has descended, the operative severs the paper between the carton and the roll by depressing a pivoted knife blade 93 (shown in Fig. 1) located above the paper, which knife is arranged in cooperative relation to a stationary blade 95 below the paper strip.

While the plungers are still within the carton and in contact with the paper strip, means are then applied to temporarily hold the paper in contact with the transverse dividing members 31 and the transverse members of the rack or frame 33, so that there may be no displacement of the paper from its given position either on the withdrawal of the plungers or before or during the filling operation.

These holding means, for convenience, are in the form of a series of small laterally extending fingers 97, there being provided one for each transverse partition member 31 and one for each transverse member of the frame 33. The fingers are mounted on a rock shaft 99 pivoted (see Fig. 6) in ears 101 formed by prolongations of the side members of the frame. The holding fingers 97 are spaced and located on the rock shaft so as to coincide in location with the transverse dividing members 31 and the construction is such that with the aid of the thumb piece 103 the rock shaft may be turned to tip the fingers back (as shown in Fig. 4) where they will not interfere with the operation of installing the paper, or, after installation of the paper, may be turned back to bring the fingers down over the paper strip (as shown in Fig. 6) so that the strip is gripped between the fingers and the dividing members 31 beneath.

The rock shaft 99 may be provided at the end opposite the thumb piece 103 with a small notched wheel 105 engaging with a spring detent 107 (Fig. 4) which serves to hold the shaft in either of its extreme positions. The holding devices are constructed so as to exert a firm grip on the paper strip when they are turned into holding or gripping position.

In order to increase the grip of the holding devices on the paper and also for a purpose to be hereinafter described, the upper edges of the dividing members 31 and the transverse members of the frame 33 may be grooved as at 109 (Figs. 6 and 7), these grooves registering with the holding fingers 97 when the latter are turned down so that they tend to sink into the recesses presented by the grooves and more firmly grip the paper thereat.

With the paper thus firmly held by the holding fingers, the plungers may be restored to their elevated positions by pressure on the foot treadle 77 and the prepared carton removed from the machine and presented to the ice cream filling or charging operation, its place being taken by another empty carton, previously assembled also within its form and with the dividing frame as before described, for a repetition of the paper installing operation.

The carton thus prepared may be filled either manually or mechanically as desired, but it is particularly adapted to be filled by a charging machine such that, when the carton, with the assembled dividing frame and separating paper, is presented to the delivery mouth of the machine, the ice cream may be forced into the prepared carton by a single operation, the ice cream being forced into the previously prepared pockets or compartments and forming separated individual portions of the brick. A type of such machine which is especially adapted to fill a carton of this kind is described in my copending application, Serial No. 153,847, filed December 10, 1926.

Where the carton is used in connection with a charging machine, it is caused to be pressed in close contact with the walls of the machine surrounding the mouth thereof, the latter, by way of example, being indicated in dotted lines in Fig. 7. The flat top of the rectangular dividing frame, fitting as it does over the top of the carton, serves the function of a gasket under these conditions, maintaining a close fitting relation between the mouth of the carton and the mouth of the charging machine. The pressure of the carton against the mouth of the charging machine also causes the holding fingers to press more deeply into the grooves 109.

The condition of the ice cream which is entered into the carton prepared as described is preferably partly frozen, that is to say, in a condition varying from what is commonly known as one-third to two-thirds frozen, or a condition which is attained by maintaining the ice cream at a temperature ranging from approximately 26° to 20° F., and the carton charged with such semi-frozen cream, after having been subsequently closed and removed from the form, is thereafter then placed in the freezing chamber, where its contents are brought to a full frozen condition, or that in which it is delivered to the dealer or consumer.

After the carton has been filled with ice cream, either manually or mechanically, the separating strip 29, the continuity of which has been maintained up to that time, is next severed over the division walls 35 so as to permit withdrawal of the frame. To accomplish this the holding fingers are tipped back into the relationship shown in Figs. 4 and 5 and the paper cut over the division walls 31.

This may be conveniently done by a single operation through a severing device, such as is illustrated in Fig. 8. The latter comprises the handle 111 carrying a cross bar 113 with the two side arms 115. A supporting rod 117 is fixed in the arms and carries a series of holders 119 in each of which is journaled a small cutting disk 121, there being at least as many such disks as there are dividing members 31 and the disks being spaced with relation to each other similarly to the spacial relationship of the dividing members.

By applying the cutting devices described to the grooves 109, the paper may be severed simultaneously by one movement of the cutter across the frame at the several desired dividing lines. As a convenience in locating the cutters at the beginning of the cutting movement, each groove 109 terminates in a wide enlargement 123 (see Fig. 6) so that the operative has merely to seat the cutting disks into the enlarged recess 123 and draw the instrument across the frame, the cutter disks tracking in the grooves 109 and severing the paper at each dividing member.

In the illustrative form of the invention I have shown the dividing frame as arranged to provide for six individual portions, but obviously it may have a lesser or greater number of sub-divisions as may be required, and the cartons prepared in this method may be designed to be charged with two or more individual portions as may be desired. The inserting mechanism comprising the six plungers illustrated in Fig. 1 may be used without change for installing the paper in the carton, requiring either two, three or six pockets, as the latter are defined by properly sub-dividing the dividing rack, but for sub-divisions of different numbers an appropriate change must be made in the construction of the installing apparatus or additional installing mechanism provided for that purpose. As a convenient means for altering the machine to provide different numbers of individual compartments, the plate 57 with the plungers and their connected parts may be removed from the supports 59 by removing the thumb screws 124, whereupon it may be replaced by another plate fitted with the required number of plungers.

In order to make the severing implement (shown in Fig. 8) usable for severing the paper on cartons having a varying number of individual portions and in connection with dividing racks of differing numbers of dividing members, the holders 119 for the cutter disks are made adjustable on the rod 117 and the latter is provided with an extra number of holders. This is indicated in the drawings by the provision of the two extra cutters shown at the left of Fig. 8 which are placed in such a position on the rod that they have no effect on the paper, the remaining cutters on the rod being spaced thereon to correspond with the spacing of the dividing members 31 on the frame 33. The holding devices 119 are provided with extensions 125 which extend over and rest upon the cross bar 113 so as to stiffen the cutter holders and afford resistance to the pressure used in severing the strip.

The paper having been severed, the frame 33 is then withdrawn from the mouth of the carton, the end margins of the paper strip 29 folded over the top of the filled carton, the end flaps 19 folded over and the side flap 21 folded over and tucked into place. The tapered shape of the partition walls 35 facilitates the ready withdrawal of the frame from the carton. When the frame is withdrawn, the semi-frozen ice cream settles down into the carton filling the spaces between the paper separating walls, and the surplus of cream at the top is crowded down by the folding in of the end and side flaps.

This leaves the carton filled with a body of ice cream in brick form, but sub-divided into units constituting the individual portions also in substantially rectangular block form and separated each from the other by the paper walls which constitute a wrapping or covering for the smaller units.

The sheet-metal holder 27 is then spread open by breaking it at the hinge 29, the carton removed and placed in the freezing chamber.

In subsequent handling the carton is treated as if the top through which it has been filled were the bottom, the carton, when its contents are removed, being designed to be opened from the opposite side, that is to say, by pulling out what is represented as the bottom flap 17 in Figs. 5 and 7, thus exposing the individual portions, each covered by its unsevered and unbroken portion of paper wrapper, this condition being represented in Fig. 2. The individual portions are readily separable when the carton is opened and each portion may then be withdrawn from the carton by the aid of the wrapper and may be handled in a sanitary manner, without manual contact with the ice cream itself.

In actual practice, the cartons may be prepared and filled with great rapidity, the cartons being prepared for the installation of the paper as represented in Fig. 5 by one operative and presented to the paper installing apparatus by a second operative, both operations taking but an instant of time.

Similarly, the prepared cartons may be charged with ice cream in a single operation of the charging machine, after which the paper may be severed, the frame withdrawn and the carton closed and removed from the form by another operative, this part of the operation also being capable of being performed quickly.

It will be seen that by this method not only are all unsanitary conditions avoided, but the process of filling a container with separately wrapped individual portions is greatly simplified, cheapened and speeded up. Obviously, the carton may be charged with ice cream of several flavors, or one or more flavors of ice cream combined with one or more flavors of sherbet or water ices, or different flavors of ices entirely, so that each individual portion comprises the several varieties introduced into the carton.

While I have herein shown and described for the purpose of illustration one specific embodiment of the invention, it is to be understood that extensive deviations may be made therefrom, all without departing from the spirit thereof.

Claims.

1. Mechanism for installing separating material in a container comprising separating members arranged at intervals and adapted to overlie the mouth of the container, and a plurality of plungers adapted to enter between said members and depress the separating material into the container and over said members to form a series of pockets therein.

2. An apparatus for installing separating material in a carton comprising a holder for the carton, means to support the holder in operative relation to the material, inserting mechanism, a plurality of members arranged at intervals transversely across the mouth of the container and its holder, a material engaging device adapted to be depressed between two of said members and to carry the material to the bottom of the container and there retain the same, and additional devices adapted to depress the separating material in folded relation and form a succession of pockets.

3. An apparatus for installing separating material in a carton in such relation as to receive individual portions of ice cream or similar material from a charging apparatus, the same comprising means for holding a continuous strip of flexible material in suitable relation to the carton, means to define the walls of separation between said individual portions, and means to tuck the flexible material into the spaces defined by separating means.

4. An apparatus for installing separating material in a carton in such relation as to receive individual portions of ice cream or similar material from a charging apparatus, the same comprising means for holding a continuous strip of flexible material in suitable relation to the carton, means to define the walls of separation between said individual portions, means to tuck the flexible material into the spaces defined by separating means to form a succession of pockets therein, and devices comprising a series of retaining members to hold the flexible material fixed in relation to said defining means when the carton is charged.

5. An apparatus for installing separating material in a carton in such relation as to receive individual portions of ice cream or similar material from a charging apparatus, the same comprising means for holding a continuous strip of flexible material in suitable relation to the carton, removable means temporarily applied to define the walls of separation between said individual portions, means to tuck the flexible material into the spaces defined by separating means to provide a series of pockets within the carton formed by the continuous strip, and means to sever the continuous strip of flexible material along the walls of separation after the carton has been charged.

6. An apparatus for installing a continuous strip of flexible, separating material in a carton adapted to be charged with individual portions of ice cream or similar material, the same comprising means for holding the strip in operative relation to the open mouth of the carton, devices adapted to be temporarily applied to and extending across the mouth of the carton beneath the flexible material for defining the walls of separation, and devices adapted to act in succession for depressing the flexible material into the spaces between the successive defining devices to install the strip in the carton in the form of a succession of pockets.

7. The method of preparing a container to receive individual separated portions of ice cream or similar material which consists in preparing the container with rigid separating walls, introducing a strip of flexible, thin, membraneous material into the container to form a succession of pockets between successive rigid separating walls, and severing the strip at the separating walls to permit withdrawal of said walls after the container has been charged.

8. The method of preparing a container to receive individual separated charges of ice cream or similar material which consists in installing in said container a strip of separating material and holding the same to form separate pockets or compartments.

9. In an apparatus for installing membraneous separating material in a carton to receive individual separated portions of ice cream or similar material, the combination with a frame adapted to be applied to the mouth of the carton and withdrawable therefrom after the carton has been filled, said frame presenting devices to define the walls of separation between successive portions, of means for holding the carton in operative relation beneath the strip of said material, and means for inserting the material between the defining devices.

10. In an apparatus for installing membraneous separating material in a carton to receive individual separated portions of ice cream or similar material, the combination with a frame adapted to be applied to the mouth of the carton and withdrawable therefrom after the carton has been filled, said frame presenting devices to define the walls of separation between successive portions, of means for holding the carton in operative relation beneath the strip of said material, means for inserting the material between the defining devices, and means to hold the material with relation to the defining devices while the carton is being filled.

11. In an apparatus for installing membraneous separating strip in a carton to receive individual separated portions of ice cream or similar material, the combination with a frame adapted to be applied to the mouth of the carton and withdrawable therefrom after the carton has been filled, said frame presenting devices to define the walls of separation between successive portions, of means for holding the carton in operative relation beneath the strip, means for inserting the strip between the defining devices, means to hold the strip with relation to the defining devices while the carton is being filled, and means to sever the strip along the defining devices after the carton is filled and before the frame is removed therefrom.

12. In an apparatus for preparing a carton to receive individual portions of ice cream or similar material separated by thin membraneous walls, a frame adapted to be applied to the carton provided with transverse dividing members adapted to locate the membraneous walls and hold the same while the carton is being filled.

13. In an apparatus for preparing a carton to receive individual portions of ice cream or similar material separated by thin membraneous walls, a removable dividing rack adapted to be applied to the mouth of the carton, said rack containing transverse partition members extending across a frame and down into the carton when the frame is applied thereto.

14. In an apparatus for preparing a carton to receive individual portions of ice cream or similar material separated by thin membraneous walls, a removable dividing rack adapted to be applied to the mouth of the carton, said rack containing transverse partition members extending across a frame and down into the carton when the frame is applied thereto, means for holding the carton with its applied frame beneath a strip of thin membraneous separating material, devices for inserting the material to line the compartments formed by the division walls, and devices adapted to be brought to bear against the material where it lies over said division walls to hold the same while the carton is being filled, said material being adapted to be severed at the division walls after the carton has been filled and the frame to be withdrawn therefrom.

15. In an apparatus for preparing a carton to receive individual portions of ice cream or similar material separated by thin membraneous walls, a dividing rack adapted to be applied to the mouth of the carton and provided with transverse partition members adapted to extend into the compartment to provide temporary separating walls whereby the same may be utilized to locate and hold the membraneous walls, and a series of holding fingers movable to and from the upper edges of the dividing members whereby the material may be held thereon while the carton is geing filled.

16. In an apparatus for preparing a carton to receive individual portions of ice cream or similar material separated by thin membraneous walls, a dividing rack adapted to be applied to the mouth of the carton and provided with transverse partition members adapted to extend into the compartment to provide temporary separating walls whereby the same may be utilized to locate and hold the membraneous walls, said dividing members being grooved on their upper edges to assist in severing the separating material after the carton has been filled.

17. In an apparatus for installing separating material in a carton in such relation to receive individual portions of ice cream or similar material from a charging apparatus, the same comprising means for holding a continuous strip of flexible material in suitable relation to the open mouth of the carton, removable means applied temporarily to define the walls of separation between said individual portions, and means to tuck the flexible material into the spaces defined by the separating removable means, the latter being adapted to support the continuous tucked strip when the charge of ice cream or similar material is received from the charging apparatus.

18. In an apparatus for installing separating material from a continuous strip in a carton, the latter adapted to be charged with individual portions of ice cream or similar material, the combination with means for holding the material in operative relation to the open mouth of the carton, of devices applicable to the carton to define the walls of separation between the individual portions, a series of plungers adapted to depress the material into the carton between the defining devices to form a succession of pockets from the strip in continuous unsevered condition, and means for actuating the plungers in succession to form the series of pockets.

19. The method of preparing a container to receive individual charges of ice cream or similar material which consists in presenting a continuous strip of flexible membraneous material to the open mouth of the carton, interposing between the strip and the carton devices to define the walls of separation between individual portions and to support the looped portions of the continuous strip, and forcing the strip into the container between said defining devices and thereby forming separate pockets within the container composed of a strip in continuous unsevered condition.

20. The method of preparing a container to receive individual charges of ice cream or similar material which consists in presenting a continuous strip of flexible membraneous material to the open mouth of the carton, interposing between the strip and the carton devices to define the walls of separation between individual portions and to support the looped portions of the continuous strip, forcing the strip into the container between said defining devices and thereby forming separate pockets within the container composed of a strip in continuous unsevered condition, and thereafter severing said strip at points between adjacent pockets.

In testimony whereof, I have signed my name to this specification.

FREDERICK X. KUHN.